United States Patent [19]

Dasher et al.

[11] Patent Number: 5,223,862
[45] Date of Patent: Jun. 29, 1993

[54] HIGH-INDEX, ORGANIC LENS MEMBER

[75] Inventors: David Dasher; E. Robert Fretz, Jr., both of Corning; John W. Nelson, Painted Post; Anthony R. Olszewski, Bath, all of N.Y.

[73] Assignee: Corning Incorporated, Corning, N.Y.

[21] Appl. No.: 682,479

[22] Filed: Apr. 8, 1991

[51] Int. Cl.$^5$ .......................... G02C 7/06; G02C 7/10
[52] U.S. Cl. .................... 351/163; 351/164; 351/172
[58] Field of Search ............... 351/163, 164, 165, 166, 351/172

[56] References Cited

U.S. PATENT DOCUMENTS 4,268,134  5/1981  Gulati et al. ...................... 351/163

Primary Examiner—Scott J. Sugarman
Attorney, Agent, or Firm—Milton M. Peterson; Clinton S. Janes, Jr.

[57] ABSTRACT

An ophthalmic lens embodying an organic plastic lens member having a refractive index of at least 1.56 and being the cured product of a monomeric formulation. The formulation contains a resin monomer base, a curing agent selected from aromatic anhydrides, aromatic diamines, thioamides and thioamines, and a refractive index enhancing additive selected from alkyl or aromatic diols or thiols and transition metal alkoxides. The organic plastic lens member may be an integral, monofocal lens, or a segment embedded in a cavity in the front, convex surface of an organic plastic, major lens member having a lesser refractive index. The latter may have a thin, inorganic glass lens member adhered to its front, convex surface to produce a glass-plastic, laminated, multifocal lens structure.

15 Claims, 1 Drawing Sheet

HIGH-INDEX, ORGANIC LENS MEMBER

FIELD OF THE INVENTION

The field is a high-index, organic plastic, ophthalmic lens member which may be an integral, monofocal lens, or a segment member in a glass-plastic, multifocal lens structure.

BACKGROUND OF THE INVENTION

There is a growing interest in organic plastic, ophthalmic lens members formed from polymers having refractive indices of at least 1.56. The lens member may be an integral, monofocal lens that provides single vision correction. Presently, the predominant organic plastic material for such a lens is a thermosetting, polycarbonate resin commercially available from PPG Industries, Pittsburgh, Pa. under the trademark CR-39. This material provides the standard refractive index of about 1.50.

Alternatively, the lens member may be a segment adapted to use in conjunction with a major lens member of lower refractive index to provide a composite multifocal lens. U.S. Pat. No. 4,793,703 (Fretz, Jr.), and pending U.S. patent application Ser. No. 07/325,880, filed Mar. 20, 1989 in the name of E. R. Fretz, Jr. and assigned to the assignee of this application, now U.S. Pat. No. 5,064,712 describe a three-layer, composite lens structure. The basic structure disclosed there is composed of an inorganic glass layer, preferably a photochromic glass, a layer of a rigid, organic plastic and an interlayer of a flexible, organic adhesive.

A characteristic feature of the structure in the patent is the relationship between the coefficient of thermal expansion of the rigid, plastic layer and the glass layer. A feature of the structure in the application is the provision of chemically reactive, organic groups on the surfaces of the layers to enhance bonding of the layers.

Multifocal lenses employ different surface curvatures, and/or materials having different refractive indices, to provide multiple visual correction. Thus, the major lens portion, or element, in a multifocal lens corrects far vision. The segment portion provides near vision correction, that is, closer focusing for reading or other close work. The segment is generally small, and located in the lower half, toward the inside, of a major lens. The most functional and widely accepted shape for the bifocal segment is referred to as a D-segment. This appears in the finished lens as a circle with the top cut off.

Multifocal lenses have long been produced in all-glass structures. Thus, a glass element, having a relatively high refractive index and commonly referred to as a segment or button, is fused in a depression formed in a full-sized lens member, known as a major or crown. The depression is usually termed a countersink. The constituent elements of, and method of producing, an all-glass, multifocal lens structure are described in some detail in U.S. Pat. No. 4,842,632 (Buckley).

All-plastic, multifocal lens structures are also available. U.S. Pat. No. 4,906,422 (Buckley) describes moulds for use in producing such lens structures. The conventional all-plastic, multifocal lens is an integral structure. Higher refraction is achieved by moulding a convex lens shape on the front of the unitary lens. Customarily then, the near vision segment in a prior, all-plastic, multifocal lens protrudes from the front of the lens.

An all-plastic lens has the distinct advantage of light weight. A glass lens is harder, and hence more resistant to scratches and other abrasive damage. Hence, there has long been a desire to effect a marriage of a scratch resistant, glass, front lens with a light weight, organic plastic, rear, or backing, lens. The Fretz, Jr. disclosures are directed to meeting this need, but do not specifically disclose a multifocal structure and production method.

PURPOSES OF THE INVENTION

A basic purpose is to provide an organic plastic, ophthalmic lens member having a high refractive index.

A further purpose is to provide an organic monomer formulation which, when cured to a polymer in proper form, is an ophthalmic lens member having a high refractive index.

Another purpose is to provide an organic plastic, monofocal lens having a high refractive index.

A further purpose is to provide an organic plastic, segment member for a glass-plastic, laminated, multifocal lens structure.

Another purpose is to provide a convenient, effective method of producing a glass-plastic, laminated, multifocal lens structure.

A further purpose is to provide such a method that does not require prefinishing of the segment member.

BRIEF SUMMARY OF THE INVENTION

The article of our invention is an ophthalmic lens embodying an organic plastic lens member having a refractive index of at least 1.56 and being the cured product of a monomeric formulation containing a curing agent selected from the groups composed of aromatic anhydrides, aromatic diamines, thioamides and thioamines and a refractive index enhancing additive selected from the group composed of alkyl or aromatic diols or thiols and transition metal alkoxides.

In one embodiment, the basis of the monomeric formulation is an epoxide or epoxide mixture. In another, the lens member is an integral, monofocal lens. In a preferred embodiment, the lens member is a segment embedded in the front, convex surface of a rigid, organic plastic, major lens member having a refractive index at least 0.04 units, and preferably at least 0.08 units, lower than that of the segment and being adhered to a thin, inorganic glass lens member of the same index. The glass lens member may be photochromic glass.

Our invention further contemplates a method of producing a four-component, glass-plastic, laminated, multifocal lens structure exhibiting optical quality transmission which comprises:

a. forming a rigid, organic plastic, major lens member;

b. forming a cavity in the front, convex surface of the organic plastic, major lens member;

c. filling the cavity with an organic plastic segment that has a higher refractive index than the organic plastic, major lens member has; and d. adhering a thin, glass lens member to the front, convex surface of the rigid, plastic lens member with an organic adhesive layer.

In a preferred embodiment, a monomeric precursor of the higher index plastic is provided in the cavity and cured in place to form a composite, plastic lens member which may be finished to desired curvature if necessary.

PRIOR ART

In addition to the patents already mentioned, attention is also directed to:

U.S. Pat. No. 2,361,589 (Bennett et al.) which discloses a segment of glass, or the like, pressed into a plastic layer sandwiched between facing layers of glass, United Kingdom Patent No. 338,555 (Bannister) which discloses a segment member buried in a cavity in a crown glass element with a plastic overlay and a second glass member over the plastic, and U.S. Pat. No. 4,944,584 (Maeda et al.) which describes an all-organic plastic, multifocal lens structure in which a cavity is formed and filled with a material of different refractive index.

None of these patents has the concept of a high index, organic plastic, monofocal lens, or of a glass-plastic laminate with an organic adhesive interlayer. Also, none provides any suggestion of the present methods of forming either monofocal or multifocal, ophthalmic lenses.

BRIEF DESCRIPTION OF THE DRAWINGS

In the attached drawings.

DESCRIPTION OF THE INVENTION

The present invention provides an organic plastic lens member having a high refractive index, that is, an index value of 1.56 or greater. In one form, the lens member may be an integral, monofocal lens. In another form, it constitutes a segment buried in the front, convex surface of an organic plastic, major lens member. The resulting composite is the optical element in a glass-plastic, laminated, multifocal lens structure.

In any event, the lens member is composed of a polymeric material that is the cured product of a precursor, monomeric formulation. In general, the formulation is composed of a resin monomer, a curing agent for the monomer and a refractive index enhancer. Optionally, the formulation may further include an antioxidant and/or compatible dyes, as well as tin octoate as a catalyst for the curing action.

While not so limited, we prefer to employ an epoxide as the resin monomer for our formulation. One such epoxide that has been found particularly useful is diglycidyl ether of bisphenol A. This may be used alone, or in conjunction with a brominated derivative. The diglycidyl ether may be one available from Dow Chemical under the designation DER-332. The brominated derivative is available from the same source under the designation DER-542.

The curing agent may be an aromatic anhydride, such as phthalic anhydride, or an aromatic diamine, such as 4,4-diaminophenylsulfone or 3,3-diaminophenylsulfone, or dianiline methane. Other potential curing agents include thioamides, such as thioacetamide, and thioamines, such as 4,4 dianiline sulfide.

A variety of materials may be added to raise the refractive index of the material. These include alkyl or aromatic diols or dithiols, such as naphthalene diol, or naphthalene thiol/dithiol, or trans stilbene. Transition metal alkoxides, such as titanium isopropoxide, zirconium butoxide and niobium ethoxide, may also be employed to increase the refractive index.

The invention was developed in the search for a high-index, segment material to use in a multifocal version of the three-component, glass-plastic, laminated lens disclosed in the Fretz, Jr. patent and application mentioned earlier. Therefore, while not so limited, the invention is further described with particular reference to that preferred embodiment. To avoid duplication, the prior disclosures are incorporated herein by reference.

The customary terminology, used by the ophthalmic trade with reference to all-glass, multifocal lenses, is adopted here for consistency. Thus, the term "major element" refers to the base member of the lens blank that provides distance correction. It is also sometimes referred to as the "crown major". The term "segment element", or, if round, the "button", refers to the supplemental portion that is normally small. It is inserted, or inlaid, to provide near vision correction, as for reading. It may also be referred to as the "addition", and is generally located in the lower half of the major lens.

Figure 1:
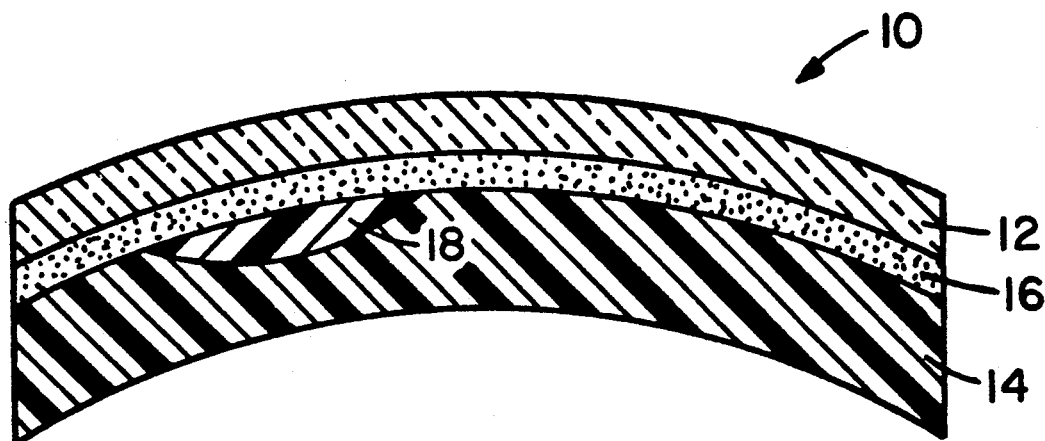
FIG. 1 is a side view in cross-section of a laminated lens structure in accordance with the invention.
Figure 2:
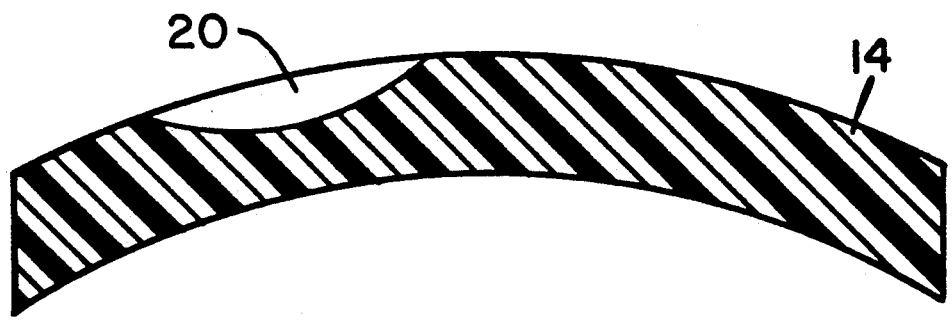
FIG. 2 is a side view in cross-section of one element of the structure of FIG. 1 in a preliminary stage.

FIG. 1 is a side view, in cross-section, of a multifocal lens blank 10 in accordance with the present invention. Lens blank 10 has a front glass layer 12, a back plastic layer 14, an adhesive interlayer 16 and a segment or button element 18. FIG. 2 is, likewise, a side, cross-section view showing plastic layer 14 without segment element 18 present. It will be appreciated that lens blank 10 may be identical with known, laminated lens construction, except for the provision of segment element 18 embedded in plastic layer 14.

Glass layer 12 may be any known ophthalmic glass of suitable refractive index. The refractive index may be selected to match that of plastic layer 14, the industry standard for glass being an index of 1.523. A white crown ophthalmic glass may be used. However, the invention is of particular value for use with photochromic glass blanks, such as are available from Corning Incorporated under Code #8134, and are described in U.S. Pat. No. 4,608,349 (Kerko et al.).

It is a particular feature of the present invention that the glass lens element 12 may be finished prior to assembly. Thus, the segment member may be separately provided in the organic plastic element. Further, any curvature that must be provided by grinding in the final assembly may be imparted to the rear or under surface of organic plastic element 14. Provision of a matching, photochromic, segment glass has been a problem in all-glass multifocals. This problem is obviated in the present laminated construction.

The plastic commonly used in all-plastic lenses is the CR-39 thermosetting resin commercially available from PPG INDUSTRIES, Pittsburgh, Pa. A feature of the Fretz, Jr. patent is use of resins having lower coefficients of thermal expansion to lessen the differential between the glass and the plastic elements. While acrylic, polycarbonate, silicone, urethane, and polyimid plastics are suggested as possibilities, a cycloaliphatic epoxy resin cured with a cyclic anhydride is recommended there. A recent U.S. patent application Ser. No. 589,403 filed Sep. 28, 1990 in the names of E. R. Fretz, Jr. and A. R. Olszewski and assigned to the assignee of this application, now U.S. Pat. No. 5,116,684 discloses preferred materials and methods for preparation of the epoxy resin for casting.

The adhesive may be any formulation leading to a flexible interlayer. The Fretz, Jr. patent discloses various epoxy adhesive formulations. A recent application, U.S. patent application Ser. No. 624,055 filed Dec. 7, 1990 in the names of R. S. Herndon, R. E. Johnson and J. M. News and assigned to the assignee of this application, recommends an adhesive formulation consisting essentially of a hydrogenated epoxide, an acrylate or blocked isocyanate end-capped urethane oligomer and an amine curing agent. Other organic adhesives contemplated include such materials as the thermoplastic urethanes (TPUs) and polyvinyl butyral (PVB).

The present invention is primarily concerned with provision of segment 18 in resin layer 14. While the segment might be incorporated in either surface, it is much preferable to embed it in the front, convex surface as shown in FIG. 1. This permits finishing the desired optical curvature in the rear surface of layer 14. It also eliminates the need to impart such curvature to the front surface of glass element 12.

It would, of course, be possible to embed a preformed segment member, either glass or plastic, in the inner surface of glass element 12. However, that would entail an undue amount of preparation of both members. It would also necessitate effecting adhesion of the members, either by glass fusion or by a glass-plastic adhesive.

It would also be possible to embed a preformed glass segment in plastic element 14. However, the same problems of separate preparation and subsequent adhesion would be encountered. Particularly difficult operations are finishing a thin edge on the segment, and maintaining that edge in subsequent sealing and finishing steps.

In accordance with our invention then, a cavity 20 is formed in element 14 to receive an organic segment 18. This may be accomplished by preforming segment 18, placing it in a mold, such as shown in co-pending U.S. patent application Ser. No. 589,403, and pouring or injecting the precursor monomer of resin member 14 into the mold.

Thus, a thermosetting material, such as an epoxy monomer, might be cast in the mold containing the segment, or formed via a reaction, injection molding technique. A thermoplastic, such as a styrenic or acrylic thermoplastic, might be injection molded.

A preferred procedure for practicing our invention involves forming a cavity 20, in the nature of a countersink, in a base major lens 14, e.g., a cast epoxy lens. Then, a higher index, organic material is introduced into the countersink and cured in place. The segment thus formed will be at least 0.04 units higher in refractive index than the major lens, and preferably at least 0.08 units higher.

The countersink can be formed in one of two ways. A standard lens of the appropriate base, that is, front curvature, can be cast, and material removed from the surface to form the countersink. For example, this may be by progressive milling of a predetermined zone on the lens. Alternatively, the desired countersink can be formed by incorporating a suitable insert in the casting mold for the base lens. In either case, the countersink must provide a surface having an optical quality finish to receive the segment forming plastic.

Position and size (diameter) of the near vision segment is important. Both the vertical and horizontal displacement of the center of curvature of the segment with respect to that of the base lens are specified. Additionally, the amount of truncation of the segment is specified by indicating the distance between the segment top and the center of curvature of the base lens.

The second step is to cast a high-index resin precursor into the counter sink. This step must be executed under clean room conditions to assure optical quality. Both the epoxy lens and mold are thoroughly washed to remove all surface contamination. A pool of the high-index formulation is poured into the mold, and the lens slowly lowered into the pool. Care is taken to avoid entrapping bubbles. The lens floats on a thin layer of liquid epoxy. The assembly is carefully placed into a programmable oven with a nitrogen atmosphere to cure.

After curing, and if the front surface of the lens is of optical quality, it can be laminated in accordance with standard procedure as previously known. If the optical quality is insufficient, the front of the lens may be polished and subsequently laminated.

The accompanying TABLE lists representative counter sink radii of curvature for a series of bifocal corrections (ADDs), and the resultant center thicknesses of the plastic lens members. Data are supplied for two different segment indices (1.600 and 1.650) and three "Base Curves" (Front surface curves). In each instance, the following conditions are fixed:

| INDEX OF MAJOR LENS | 1.523 |
| --- | --- |
| SEGMENT DIAMETER | 25 mm |
| BASE TO SEGMENT OPTICAL CENTER | 10 mm |
| BASE OPTICAL CENTER TO SEGMENT TOP | 3 mm |

In the TABLE, lens radius, in mm., is shown as "RAD"; the lens thickness at its center, again in mm, is shown as "T.C.". Lens thickness is kept to a minimum in the interest of light weight.

TABLE

| ADD | RAD | TC | ADD | RAD | TC |
| --- | --- | --- | --- | --- | --- |
| SEGMENT INDEX 1.600 BASE DIOPTER 2.19 | | | SEGMENT INDEX 1.650 BASE DIOPTER 2.19 | | |
| 1.00 | −113.64 | 0.70 | 1.00 | −271.25 | 0.29 |
| 1.25 | −83.01 | 0.96 | 1.25 | −176.83 | 0.45 |
| 1.50 | −65.39 | 1.22 | 1.50 | −131.17 | 0.60 |
| 1.75 | −53.94 | 1.48 | 1.75 | −104.25 | 0.76 |
| 2.00 | −45.90 | 1.75 | 2.00 | −86.50 | 0.92 |
| 2.25 | −39.95 | 2.02 | 2.25 | −73.91 | 1.07 |
| 2.50 | −35.36 | 2.30 | 2.50 | −64.53 | 1.23 |
| 2.75 | −31.72 | 2.58 | 2.75 | −57.25 | 1.39 |
| 3.00 | −28.76 | 2.88 | 3.00 | −51.45 | 1.55 |
| SEGMENT INDEX 1.600 BASE DIOPTER 4.18 | | | SEGMENT INDEX 1.650 BASE DIOPTER 4.18 | | |
| 1.00 | −200.21 | 0.76 | 1.00 | PLANO | 0.36 |
| 1.25 | −121.34 | 1.02 | 1.25 | −540.49 | 0.51 |
| 1.50 | −87.05 | 1.28 | 1.50 | −261.87 | 0.67 |
| 1.75 | −67.87 | 1.54 | 1.75 | −172.80 | 0.83 |
| 2.00 | −55.61 | 1.80 | 2.00 | −128.94 | 0.98 |
| 2.25 | −47.11 | 2.07 | 2.25 | −102.84 | 1.14 |
| 2.50 | −40.86 | 2.34 | 2.50 | −85.52 | 1.29 |
| 2.75 | −36.07 | 2.62 | 2.75 | −73.20 | 1.45 |
| 3.00 | −32.29 | 2.91 | 3.00 | −63.98 | 1.61 |
| SEGMENT INDEX 1.600 BASE DIOPTER 6.21 | | | SEGMENT INDEX 1.650 BASE DIOPTER 6.21 | | |
| 1.00 | −898.30 | 0.79 | 1.00 | N.A. | 0.39 |
| 1.25 | −229.26 | 1.05 | 1.25 | N.A. | 0.54. |
| 1.50 | −131.46 | 1.31 | 1.50 | PLANO | 0.70 |
| 1.75 | −92.14 | 1.57 | 1.75 | −524.74 | 0.85 |
| 2.00 | −70.92 | 1.83 | 2.00 | −258.12 | 1.01 |
| 2.25 | −57.65 | 2.09 | 2.25 | −171.15 | 1.17 |
| 2.50 | −48.56 | 2.36 | 2.50 | −128.02 | 1.32 |
| 2.75 | −41.95 | 2.63 | 2.75 | −102.25 | 1.48 |
| 3.00 | −36.92 | 2.91 | 3.00 | −85.12 | 1.64 |

SPECIFIC EMBODIMENTS

The following examples illustrate various formulations developed for segment formation. They also report the refractive indices and Abbé values measured on the segment resins formed. In each case, the segment formulation was cast and cured in a countersink of appropriate radius and curvature formed in an epoxy base lens. All percentages are by weight unless otherwise indicated.

EXAMPLE I

A mixture of 80.32% DER-332 epoxy monomer, 4.60% propylene glycol and 15.08% methylene dianiline was prepared and stirred until uniform. This mixture was then cured in the countersink of an epoxy base lens. The curing cycle was 125° C. for 17 hours followed by an additional 5 hours at 155° C.

The cured segment resin exhibited a refractive index of 1.608 and an Abbé number of 31.

EXAMPLE II

A uniform mixture was produced that contained 59.83% DER-332, 36.70% phthalic anhydride, 3.43% propylene glycol, and 0.004% tin octoate, This mixture was cured with a cycle of 17 hours at 125° C. followed by an additional 5 hours at 135° C.

The cured segment resin exhibited a refractive index of 1.586 and an Abbé number of 29.

EXAMPLE III

A uniform mixture was produced that was composed of 33.56% DER-332, 21.10% DER-542, 7.44% ERL-4221, 34.49% phthalic anhydride, 3.40% propylene glycol and 0.004 tin octoate. This mixture was cured for 1.5 hours at 125° C. followed by 17 hours at 135° C.

The cured segment resin exhibited a refractive index of 1.586 and an Abbé number of 30.8

EXAMPLE IV

In this example, 39.70% DER-332 and 21.56% DER-542 were uniformly mixed with 35.23% phthalic anhydride and 3.48% propylene glycol. The curing cycle was 1½ hours at 125° C. followed by 17 hours at 135° C.

The resulting resin exhibited a refractive index of 1.592 and an Abbé number of 31.

EXAMPLE V

This example illustrates the use of thioacetamide as a curing agent. The composition was mixed at 80° C. and was composed of 10.25% ERL-4221 (an aliphatic epoxy monomer) 61.62% DER-332, 4.69% propylene glycol and 23.44% thioacetamide. The curing cycle was 12 hours at 110° C. followed by 4 hours at 120° C. and 2 hours at 150° C.

The cured resin exhibited a refractive index of 1.602 and an Abbé number of 30.

EXAMPLE VI

A mixture of 77.61% DER-332, 4.13% propylene glycol, 18.22% 4.4'-diaminophenyl sulfone and 0.04% tin octoate was stirred until uniform. The mixture was cured for 17 hours at 135° C. followed by five hours at 165° C.

The cured resin had a refractive index of 1.618 and an Abbé number of 26.

EXAMPLE VII

This stirred mixture was composed of 71.47% DER-542, 6.30% ERL-4421, 2.52% propylene glycol, 11.81% diaminophenylsulfone, 7.87% t-stilbene, and 0.004% tin octane. The curing cycle was 5 hours at 120° C., 12 hours at 135° C. and 4 hours at 160° C.

The resin produced exhibited a refractive index of 1.645 and an Abbé number of 25.

EXAMPLE VIII

This example illustrates use of a transition metal alkoxide, zirconium butoxide. The mixture contained 30.70% DER-332, 19.30% DER-542, 31.55% hexahydrophthalic anhydride, 3.61% propylene glycol, 6.80% ERL-4221, 0.003% tin octoate and 8.50% zirconium butoxide. The mixture was cured by heating at 100° C. for 5 hours followed by 12 hours at 135° C. and then 5 hours at 165° C.

The resulting resin exhibited a refractive index of 1.598 and an Abbé number of 30.6.

EXAMPLE IX

A cast lens was prepared from the epoxy resin described in Example I according to the procedure described in the Fretz, Jr. patent. Specifically, the resin solution was poured into a cavity formed by a concave glass mold which had been treated with a mold release; which had a silicone or other suitable rubber gasket; and which was covered by another, like treated, convex glass mold. This was then cured as described in Example I to produce a major lens having the same properties as described for the material from Example I. This lens could be finished as a single vision lens according to known industry practices, or laminated to a thin (1 mm) glass cap to produce a laminated lens. The lamination was performed using a thin sheet (0.010"–0.015" thick) of a thermoplastic urethane adhesive, SG-93A from Thermedics Inc. The glass was a photochromic glass which was cleaned and silane treated as described in the Fretz, Jr. patent. Lamination was performed using a vacuum sealed bag in an autoclave at elevated temperature and pressure (e.g., at 130° C. and 100 psig pressure for 1 hour). Lamination could also be done using the adhesives and procedures specifically described in examples in the Fretz, Jr. patent. The laminated lenses were used to prepare ophthalmic lenses according to standard industry practices.

We claim:

1. An ophthalmic lens embodying an organic plastic lens member having a refractive index of at least 1.56 and being the cured product of a monomeric formulation containing a curing agent selected from the groups composed of aromatic anhydrides, aromatic diamines, thioamides and thioamines, and a refractive index enhancing additive selected from the group composed of alkyl or aromatic diols or thiols and transition metal alkoxides.

2. An ophthalmic lens in accordance with claim 1 wherein the organic plastic lens member is an integral, monofocal lens.

3. An ophthalmic lens in accordance with claim 1 wherein the organic plastic lens member is a segment embedded in a cavity in the front, convex surface of an organic plastic, major lens member having a lesser refractive index than the segment.

4. An ophthalmic lens in accordance with claim 1 wherein the organic plastic lens member is the cured product of a formulation based on a thermosetting resin monomer.

5. An ophthalmic lens in accordance with claim 4 wherein the thermosetting resin monomer is an epoxide.

6. An ophthalmic lens in accordance with claim 5 wherein the epoxide monomer is a diglycidyl ether of bisphenol A alone or in admixture with a brominated derivative thereof.

7. An ophthalmic lens in accordance with claim 1 wherein the curing agent is an aromatic anhydride.

8. An ophthalmic lens in accordance with claim 6 wherein the curing agent is phthalic anhydride.

9. An ophthalmic lens in accordance with claim 1 wherein the refractive index enhancing additive is an alkyl diol.

10. An ophthalmic lens in accordance with claim 9 wherein the alkyl diol is propylene glycol.

11. A four-component, glass-plastic, laminated, multifocal lens structure exhibiting optical quality transmission and comprising an organic plastic lens member and a thin, inorganic glass lens member, the organic plastic lens member being a segment embedded in a cavity in the front, convex surface of an organic plastic, major lens member having a lesser refractive index than the segment, and the glass lens member being adhered to the front, convex surface of the organic plastic lens member by an organic adhesive interlayer between the glass and organic plastic lens members.

12. A multifocal lens structure in accordance with claim 11 wherein the refractive indices of the glass and the organic plastic lens members are essentially the same, and that of the organic plastic segment is at least 0.04 units greater than that of the organic plastic, major lens member.

13. A multifocal lens structure in accordance with claim 11 wherein the refractive index of the organic plastic segment is at least about 1.600.

14. A multifocal lens structure in accordance with claim 11 wherein the glass lens member is a photochromic glass.

15. A multifocal lens structure in accordance with claim 11 wherein the organic plastic segment is cured in place in a cavity in the organic plastic, major lens member.

* * * * *